Nov. 25, 1969    G. J. LUKAS ET AL    3,479,874
MOUNTING FASTENERS FOR LIQUID LEVEL GAUGES
Filed April 1, 1968    2 Sheets-Sheet 1
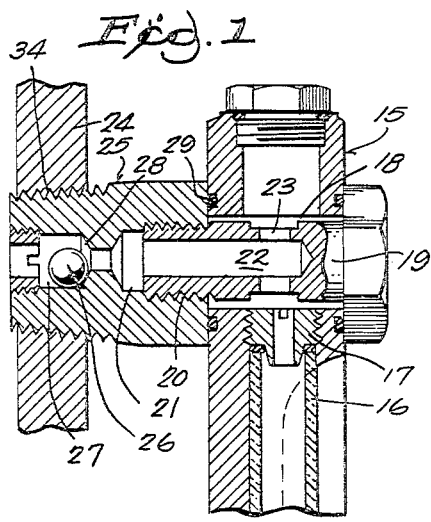
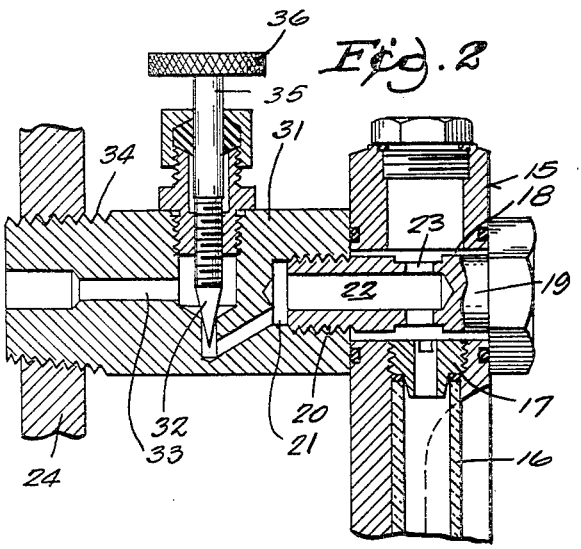
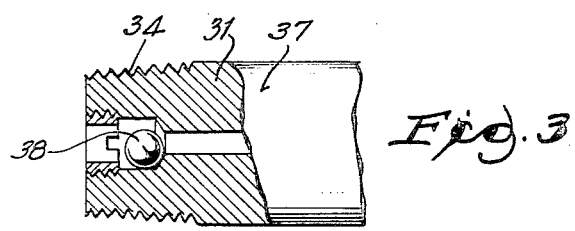
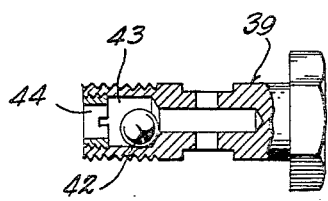
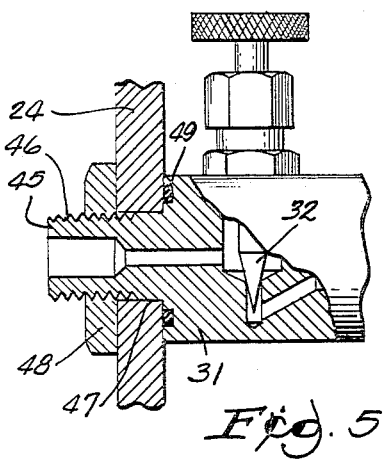
INVENTORS
GUS J. LUKAS
FLOYD J. BYDALEK
BY Wheeler, Wheeler, House & Clemency
ATTORNEYS

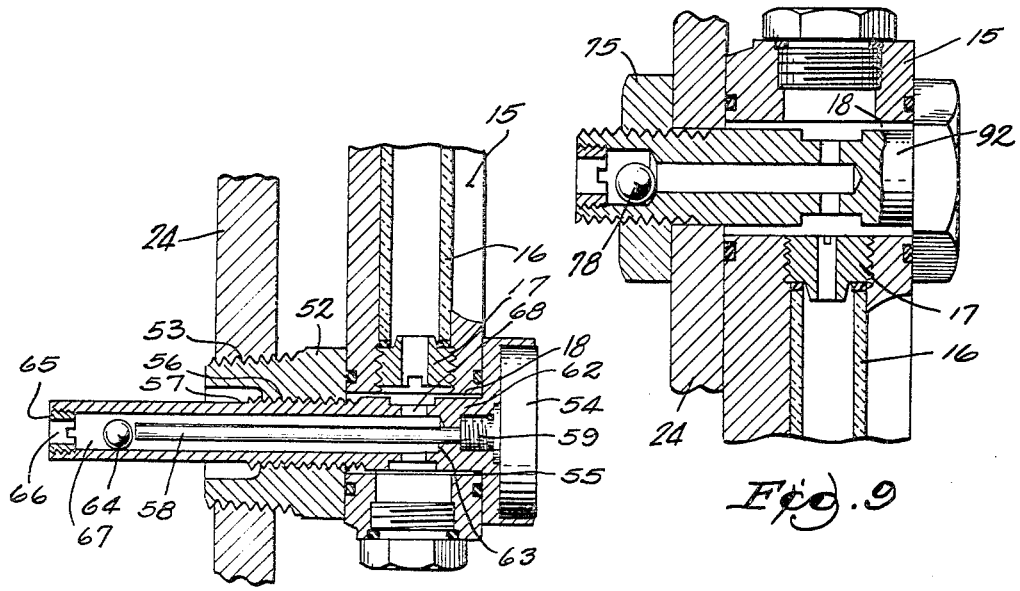
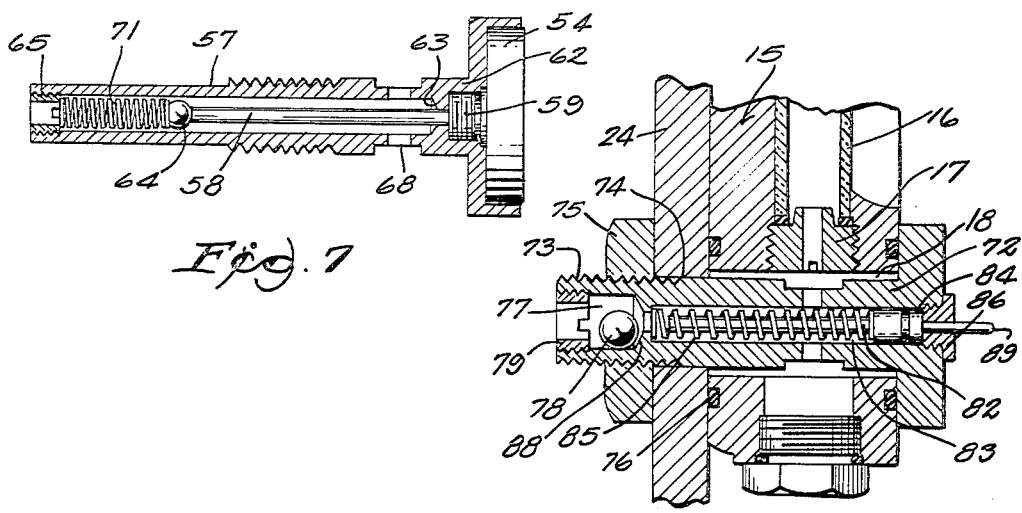

United States Patent Office 3,479,874
Patented Nov. 25, 1969

3,479,874
MOUNTING FASTENERS FOR LIQUID LEVEL
GAUGES
Gus J. Lukas and Floyd J. Bydalek, Manitowoc, Wis.,
assignors to Lube Devices, Inc., Manitowoc, Wis., a
corporation of Wisconsin
Filed Apr. 1, 1968, Ser. No. 717,598
Int. Cl. G01f 23/02
U.S. Cl. 73—292                    8 Claims

ABSTRACT OF THE DISCLOSURE

A liquid level gauge having a mounting fastener by which the gauge is mounted on a tank wall, said fastener having a liquid passage for fluid flow between the tank and the gauge and a fluid shutoff mechanism in the passage to control the fluid flow.

---

The gauge body 15 which appears in all of the figures of the drawings herein to exemplify the gauge is desirably of the same construction shown in our copending United States application Ser. No. 670,696, filed Sept. 26, 1967, as a continuation in part of our United States patent application Ser. No. 407,710, filed Oct. 30, 1964, and now abandoned. The disclosures of said patent applications are incorporated herein by reference.

Summary of the invention

The mounting fastener embodying the invention incorporates one form or another of shutoff mechanism such as an automatic ball check or a manually controlled needle valve. These fasteners may mount the gauge directly to the tank wall or may constitute a stand-off adapter to space the gauge from the wall. The shutoff mechanism may be incorporated directly into such an adapter or it may be incorporated in a mounting bolt by which the gauge is connected with such an adapter or alternatively connects the gauge directly to the tank wall.

In some embodiments of the invention, a ball check valve reseating mechanism can be provided. In one embodiment, this takes the form of a sensing stem of a thermometer having a dial face mounted on the front of the gauge.

The mounting fasteners of the present invention are adapted to serve a wide variety of liquid level gauge. Either automatic or manual shutoff mechanism is readily provided in the mounting fastener itself without requiring additional parts.

Other objects, features and advantages of the invention will appear from the following disclosure.

Drawings

FIG. 1 is a fragmentary cross section taken through one embodiment of the invention.

FIG. 2 is a fragmentary cross section taken through another embodiment of the invention.

FIG. 3 is a fragmentary cross section through a mounting fastener of the type shown in FIG. 2 but which incorporates an automatic check valve in the fastener.

FIG. 4 is a cross section taken through a form of mounting bolt including an automatic check valve. This bolt may be substituted for the bolt shown in FIG. 2.

FIG. 5 is a fragmentary cross section taken through an adapter similar to that shown in FIG. 2 but in which the adapter has straight or helical threads, instead of pipe threads.

FIG. 6 is a fragmentary cross section taken through a gauge having a dial thermometer mounted on its front wall and in which the mounting fastener in which the ball valve is housed aligns with the sensing stem on the thermometer.

FIG. 7 is a fragmentary cross section taken through a modified embodiment of the gauge of FIG. 6 and in which there is a spring loaded ball check valve.

FIG. 8 is a fragmentary cross section taken through another embodiment of the invention which incorporates a manually actuated resetting stem to unseat the ball valve.

FIG. 9 is a fragmentary cross section taken through another embodiment of the invention in which the fastener constitutes a mounting bolt with ball check.

Description of the preferred embodiments

Although the disclosure hereof is detailed and exact to enable those skilled in the art to practice the invention, the physical embodiments herein disclosed merely exemplify the invention which may be embodied in other specific structure.

Like parts in the various views are given the same reference characters.

Gauge 15 typically carries a transparent sight or glass 16 in a hollow passage within the gauge body 15. The sight 16 is held in place by a threaded plug 17. There is typically a transverse opening or passage 18 through the body 15. Within the passage 18 there is a mounting bolt 19 which has an axial passage or bore 22 and a transverse passage or bore 23 to provide for fluid flow between the sight 16, and the interior of the tank 24 to which the gauge is attached by a mounting fastener which in this embodiment constitutes a stand-off adapter 25. Bolt 19 has threads 20 engaging complementary threads in the bore 21 of mounting fastener 25. Bolt 19 attaches the gauge body 15 to the adapter 25. O-ring 29 seals the joint. The adapter 25 is provided with an automatic ball check valve 26 which is free to move within a ball chamber 27 to and from valve seat 28.

Accordingly, ball check valve 26 will automatically preclude fluid flow from the tank 24 through the passage 27 of the mounting fastener 25, for example, if the sight glass 16 breaks or if any thermometer mounted at the lower end of the gauge, as shown in FIG. 6, for example, is removed.

FIG. 2 shows a mounting fastener 31 somewhat longer than the mounting fastener 25 of FIG. 1. Mounting fastener 31 carries a needle valve 32 which controls fluid flow through the passage 33 in the fastener 31. The other parts are similar to those shown in FIG. 1 and are given the same reference characters.

The device of FIG. 2 does not have the ball check valve as shown in FIG. 1, inasmuch as all control of fluid flow through passage 33 is exercised by the needle valve 32 which has a stem 35 with a knurled nut 36 for the manual actuation of the valve 32.

Both fasteners 25 and 31 are provided with pipe threads 34 by which the fasteners 25, 31 are directly mounted in the complementary pipe threads formed in the wall 24.

FIG. 3 shows a fragment of a modified version 37 of the stand-off adapter 31, except that in this embodiment an automatic ball check valve 38 is incorporated in the tail end of the adapter 37 which is screwed into the wall 24.

In FIG. 4 a modification of the mounting bolt 19 of FIG. 2 is illustrated. This mounting bolt 39 is provided with a ball check valve 42 disposed in chamber 43 which is closed by plug sleeve 44.

Accordingly, if an automatic check valve is desired in the structure shown in FIG. 2, the fastener 31 may be replaced by fastener 37 which incorporates the ball check at 38. Alternatively, the mounting bolt 19 may be replaced by mounting bolt 39 of FIG. 4. In either event, the fluid flow through the fastener passage is subject to the control both of the manually actuated needle valve 32, and a ball check 38 or 42.

FIG. 5 shows a modification of the structure shown in FIG. 2 in which the tail end 45 of a fastener otherwise similar to fastener 31 is provided with a reduced portion having straight or helical threads 46 by which the fastener 31 is attached to wall 24. For this purpose, wall 24 is provided with an unthreaded opening 47. The threaded tail 45 is passed through the opening 47 and the fastener is mounted thereon with a nut 48. The pressure on the nut also tightens the O-ring seal 49 to insure against leakage.

FIG. 6 shows a modification in which a gauge body 15 similar to those hereinbefore described is mounted on tank wall 24 by a mounting fastener 52 which may have either pipe threads 53 as shown in FIG. 6, or straight threads such as thread 46 of FIG. 5. This embodiment is designed to accommodate a dial thermometer 54 with its dial face mounted on the front of the gauge over an opening 55 provided through the front wall of the gauge body 15. The fastener 52 is provided with a threaded hollow passage 56 into which thermometer mounting bolt 57 is threaded. Bolt 57 provides a protective housing for the sensing stem 58 mounted on the rear stud 59 of the thermometer 54. The bolt 57 has a hub 62 into which the stud 59 is threaded and which also provides a tapered seat 63 for ball check 64. The ball check 64 is held captive by a plug sleeve 65.

When the thermometer 54 is inserted as shown in FIG. 6, stem 58 pushes the ball 64 away from the seat 63 and allows fluid to flow from the tank 24 through the central passage 66 in the plug 65, through the hollow passage 67 in the bolt 57, and through the cross opening 68 into the sight 16. However if the thermometer 54 is removed, thus withdrawing the stem 58 through the front of the gauge, the pressure of the liquid will cause the ball 64 to travel with the stem until it seats against the seat 63. This seals the gauge against loss of liquid through the threaded opening 68 in the hub 62 into which the thermometer stud 59 is normally sealed. This structure facilitates removal and replacement of damaged thermometers without loss of liquid.

FIG. 7 shows a modified embodiment in which the bolt 57 is provided with a bias spring 71 against which the ball must be urged under pressure of the thermometer stem 58. Accordingly, if the stem 58 is removed as aforesaid, the spring 71 biases the ball 64 toward its seat 63.

FIG. 8 shows another embodiment in which the gauge body 15 is mounted directly against the tank wall 24 by a mounting fastener which constitutes a hollow threaded mounting bolt 72. The tail end of the mounting bolt may have pipe threads, or it may have the illustrated helical threads 73 which extend through an opening 74 in the wall 24. A nut 75 clamps the fastener 72 to the wall 24 and also puts pressure on the O-ring seal 76.

Mounting bolt 72 is provided in its tail end with a chamber 77 for a ball check valve 78. The chamber 77 is partially closed by a plug sleeve 79. In this embodiment there is a manually actuated reset stem 82 mounted within a hollow passage 83 extending through the bolt 72. Stem 82 carries a guide piston 84 biased by spring 85 toward closing plug 86.

Ordinarily fluid may flow through the passage 85 between the interior of the tank 24 and the sight 16 of gauge 15. If the glass 16 is broken, resulting in a loss of pressure on the gauge side of the ball valve 78, the ball valve will automatically close against its seat 88. When the sight glass is replaced and it is desired to restore liquid flow into the valve, plunger 82 is actuated by pressing on its extending stem portion 89, thus to unseat the ball 78 against the pressure of the liquid in the tank. As soon as the pressure equalizes on all sides of the ball, liquid will flow in normal manner. This construction greatly simplifies the replacement of the gauge glass. There will be no leakage of liquid during the replacement process and the ball can be unseated in a simple manner after the replacement has been effectuated.

FIG. 9 shows a construction similar to FIG. 8 in which a threaded bolt type of mounting fastener 92 mounts the gauge body 15 directly on the tank wall 24. The FIG. 9 device has a ball check valve 78 similar to that shown in FIG. 8. However, in this embodiment there is no resetting stem.

When FIGS. 8 and 9 are viewed together, they show the top and bottom of the same gauge, both the top and bottom mounting fasteners having fluid shutoff mechanism.

In preferred embodiments, the threaded bolts 19, 57, 72, 92 all have the same diameter and thread sizes and are received alternatively through the tank wall 24, as shown in FIGS. 8 and 9, or into stand-off adapters 25, 31, 52, as shown in FIGS. 1, 2, 5 and 6. Accordingly, a modular mounting structure is created by which the gauge can be mounted directly on the tank wall, or on stand-off adapters, without need for special fittings or extra parts. Whichever mounting fastener is used, shutoff mechanism in the fitting controls fluid flow.

We claim:
1. A liquid level gauge comprising a gauge body, a separate mounting fastener by which the gauge body is mounted on a tank wall, said fastener having a passage for fluid flow between the tank and the gauge, fluid shutoff mechanism in said passage to control said fluid flow, said fastener comprising a stand-off adapter by which the gauge is spaced from the tank wall, said adapter having threads formed in said passage and an end surface adapted to receive the gauge body in abutting relation, said gauge body having and end surface abutting the said end surface of said adapter, and a mounting bolt with a threaded end fastening the gauge body to the adapter and having its threaded end engaged in the passage threads to hold the adapter and body in abutting relation, said bolt having a fluid passage connecting said fastener passage and the interior of said gauge body.

2. The gauge of claim 1 in which said shutoff mechanism comprises a ball check valve.

3. The gauge of claim 1 in which said shutoff mechanism comprises a needle valve with a manually controlled stem.

4. The gauge of claim 1 in which said shutoff mechanism comprises a ball check valve and a resetting stem provided in said passage by which the ball may be unseated.

5. The gauge of claim 1 in which the fastener has pipe threads by which the fastener is attached to the tank wall.

6. The gauge of claim 1 in which said fastener has straight threads, said tank wall having an opening through which the threaded portion of the fastener extends, and a nut on the opposite side of the wall in engagement with said threads.

7. A liquid level gauge comprising a gauge body, a separate mounting fastener by which the gauge body is mounted on a tank wall, said fastener having a passage for fluid flow between the tank and the gauge, fluid shutoff mechanism in said passage to control said fluid flow, a thermometer mounted on said gauge, said shutoff mechanism comprising a ball check valve, said thermometer having a stem which extends into said passage into contact with said ball to unseat the ball when the stem is inserted, removal of the thermometer and stem relieving the ball of stem pressure whereby the ball will seat.

8. The gauge of claim 7 in which there is a spring biasing the ball toward its seat.

References Cited

UNITED STATES PATENTS 998,104   1/1911   Leonhardt _____ 73—332 X
1,444,016  2/1923   Warthen et al. _____ 137—559 X (References on following page)

FOREIGN PATENTS

| | | |
|---|---|---|
| 1,570,938 | 1/1926 | Butler et al. _____ 73—292 |
| 1,934,849 | 11/1933 | Ericson et al. _____ 73—363.9 X |
| 1,937,755 | 12/1933 | Ginger et al. _____ 137—559 |
| 2,320,731 | 6/1943 | Hooper et al. _____ 73—292 |
| 2,603,091 | 7/1952 | Lamb _____ 73—349 |

FOREIGN PATENTS

| | | |
|---|---|---|
| 312,032 | 5/1919 | Germany. |
| 210,134 | 1/1924 | Great Britain |
| 210,134 | 1/1924 | Great Britain. |

LOUIS R. PRINCE, Primary Examiner

D. M. YASICH, Assistant Examiner

U.S. Cl. X.R.

73—332